（12） United States Patent
Chang

(10) Patent No.: US 8,967,111 B1
(45) Date of Patent: Mar. 3, 2015

(54) OIL COLLECTION AND FORCED LUBRICATION STRUCTURE OF A MODEL ENGINE CRANKSHAFT

(71) Applicant: Golden Lion Enterprise Co., Ltd., Taichung (TW)

(72) Inventor: Lien-Sheng Chang, Taichung (TW)

(73) Assignee: Golden Lion Enterprise Co., Ltd., Taichung (TW)

( * ) Notice: Subject to any disclaimer, the term of this patent is extended or adjusted under 35 U.S.C. 154(b) by 0 days.

(21) Appl. No.: 14/167,554

(22) Filed: Jan. 29, 2014

(51) Int. Cl.
*F01M 1/06* (2006.01)
*F01M 11/02* (2006.01)

(52) U.S. Cl.
CPC ........... *F01M 1/06* (2013.01); *F01M 2001/062* (2013.01); *F01M 11/02* (2013.01)
USPC ...................... 123/196 R; 123/197.4; 184/6.5

(58) Field of Classification Search
CPC ... F01M 1/06; F01M 11/02; F01M 2001/062; F01M 2011/026
USPC ............................... 123/196 R, 197.4; 184/65
See application file for complete search history.

(56) References Cited

U.S. PATENT DOCUMENTS

| | | | | |
|---|---|---|---|---|
| 2,239,447 | A * | 4/1941 | Ryder | 184/6.21 |
| 2,936,748 | A * | 5/1960 | Jensen | 123/196 CP |
| 4,088,097 | A * | 5/1978 | Litz | 123/73 AA |
| 6,397,795 | B2 * | 6/2002 | Hare | 123/65 PE |
| 6,644,263 | B2 * | 11/2003 | Hare | 123/196 R |
| 6,935,297 | B2 * | 8/2005 | Honda et al. | 123/196 R |
| 7,493,756 | B2 * | 2/2009 | Mizuno et al. | 60/339 |
| 8,701,623 | B2 * | 4/2014 | Kono et al. | 123/196 W |
| 8,763,569 | B2 * | 7/2014 | Naoe et al. | 123/48 B |
| 8,813,715 | B2 * | 8/2014 | Kasai et al. | 123/196 W |

* cited by examiner

*Primary Examiner* — Noah Kamen
*Assistant Examiner* — Grant Moubry
(74) *Attorney, Agent, or Firm* — Ming Chow; Sinorica, LLC

(57) ABSTRACT

An oil collection and forced lubrication structure of a model engine has an oil-collecting groove provided at a circumferential wall of a passageway of a crankshaft body. The oil-collecting groove is disposed with a lubrication hole extending to pass through a projecting shaft of the crankshaft body. Thus, when oil gas gets into the passageway of the crankshaft body, the oil gas will be cast by the centrifugal force produced by rotation of the crankshaft body and attached on the circumferential wall of the passageway to be collected and pre-stored in the oil-collecting groove. Then, the oil gas will be cast to the outer circumference of the projecting shaft via the lubrication hole to produce forced lubrication effect between the projecting shaft and a piston rod, thus enhancing lubrication effect, enabling the crankshaft to rotate smoothly and elevating engine efficiency.

4 Claims, 5 Drawing Sheets

OIL COLLECTION AND FORCED LUBRICATION STRUCTURE OF A MODEL ENGINE CRANKSHAFT

BACKGROUND OF THE INVENTION

1. Field of the Invention

This invention relates to a model engine structure, particularly to an oil collection and forced lubrication structure of a model engine crankshaft.

2. Description of the Prior Art

A conventional model engine, as shown in FIG. 1, includes a longitudinal cylinder 1 installed therein with a piston 2 able to carry out axial motion along the cylinder 1. The piston 2 is provided with a piston rod 3 having one end pivotally fixed at the lower side of the piston 2 and another end stretching downward and jutting out of the cylinder 1 to be pivotally connected with a crankshaft 4, which is transversely assembled at a lower side of the cylinder 2 and extends out of the engine body. Thus, when the model engine is operated, the piston 2 will carry out reciprocating motion in the cylinder 1 and simultaneously, the crankshaft 4 will be driven by the piston rod 3 to rotate and output power produced by operation of the model engine.

The crankshaft 4 has one lengthwise end axially provided with a projecting shaft 5 at a location deviating from the center of the crankshaft 4. The projecting shaft 5 has its radial outer circumferential side fitted thereon with a brass bush 6 to be axially and pivotally connected with the piston rod 3 for operating together. Further, the crankshaft 4 has the face of one end, where the projecting shaft 5 is provided, disposed with a passageway 7 that extends axially along the crankshaft 4 to an intermediate section of the crankshaft 4 and is gradually contracted toward the center of the crankshaft 4, in other words, the inner diameter of the passageway 7 is gradually enlarged toward the end of the crankshaft 4. Furthermore, the crankshaft 4 has one side of its intermediate section bored with a through port 8 communicating with the passageway 7 and has the circumferential wall of its passageway 7 formed with a lubrication hole 9 extending toward the projecting shaft 5 and having its terminal passing through the circumferential walls of both the projecting shaft 5 and the brass bush 6. Thus, when the model engine is operated, mixed oil gas of fuel oil with air will pass through the through port 8 along with the period of cycling of reciprocating motion of the piston 2 and then, the oil gas will pass through the passageway 7 and get into the cylinder 1 to be used by the model engine for operation. And when the oil gas passes through the passageway 7, the centrifugal force produced when the crankshaft 4 is rotated at high speeds will make the oil gas cast outward toward the inner circumferential wall of the passageway 7 and attached thereon. When the oil gas is cast outward along the gradually enlarged inner circumferential wall of the passageway 7, partial oil gas attached on the inner circumferential wall of the passageway 7 will get into the lubrication hole 9 and diffuse to the brass bush 6 in an outward casting process, thus able to produce a lubricating effect to the crankshaft 4 when the crankshaft 4 is rotated.

However, in an operating process of the conventional model engine, when the oil gas passes through the passageway 7, the oil gas that can get into the lubrication hole 9 is very scarce; therefore, when the crankshaft 4 is rotated to push the oil gas to enter the model engine. the axially and pivotally joined portion of the projecting shaft 5 of the crankshaft 4 with the piston rod 3 will bear great damping because of mutual contact and friction in an operating process. As a result, when the model engine is operated, the crankshaft 4 is unable to rotate smoothly, thus influencing the oil gas to enter the cylinder 1 and decreasing efficiency of power output. Even more, when the model engine is operated at high speeds and rotated more than 18000 rpm, the brass bush 6 provided at the pivotally coupled portion of the projecting shaft 5 and the piston rod 3 is likely to be rubbed and damaged. In view of above-mentioned defects, the inventor of this invention thinks that the conventional model engine is necessary to be ameliorated and hence devises this invention.

SUMMARY OF THE INVENTION

The objective of this invention is to offer an oil collection and forced lubrication structure of a model engine crankshaft, able to enhance lubrication to the axially and pivotally coupled portion of a crankshaft and a piston rod for preventing the pivotally coupled portion of the crankshaft and the piston rod from being damaged, and thus enabling the crankshaft to rotate and push oil gas comparatively smoothly, and greatly elevating engine efficiency and horsepower output.

The oil collection and forced lubrication structure of a model engine crankshaft in the present invention includes a crankshaft body having one end provided with a projecting shaft at a location deviating from the center of the crankshaft and axially positioned along the crankshaft body. The crankshaft body has the face of one end, where the projecting shaft is provided, formed with a passageway stretching axially to an intermediate section of the crankshaft body, and the crankshaft body has its intermediate section bored with a through port communicating with the passageway. Further, the passageway has its circumferential wall bored with a lubrication hole, which extends toward the projecting shaft and has its end passing through the circumferential wall of the projecting shaft, letting the lubrication hole extend from the circumferential wall of the passageway to pass through the circumferential wall of the projecting shaft. The passageway of the crankshaft body has its circumferential wall provided with an oil-collecting groove at a location of the lubrication hole, letting the lubrication hole positioned in the oil-collecting groove.

The oil collection and forced lubrication structure of a model engine crankshaft in the present invention has its projecting shaft axially and pivotally coupled with a piston rod and has the oil-collecting groove collecting and pre-storing oil gas. Thus, when the engine is operated, the oil gas in the passageway can diffuse to the outer circumferential wall of the projecting shaft via the lubrication hole to produce lubrication effect between the projecting shaft and the piston rod for enhancing lubrication at the pivotally coupled portion of the crankshaft and the piston rod, thus preventing the pivotally coupled portion of the crankshaft and the piston rod from being damaged, enabling the crankshaft to rotate and push oil gas more smoothly and also greatly elevating engine efficiency and horsepower output.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
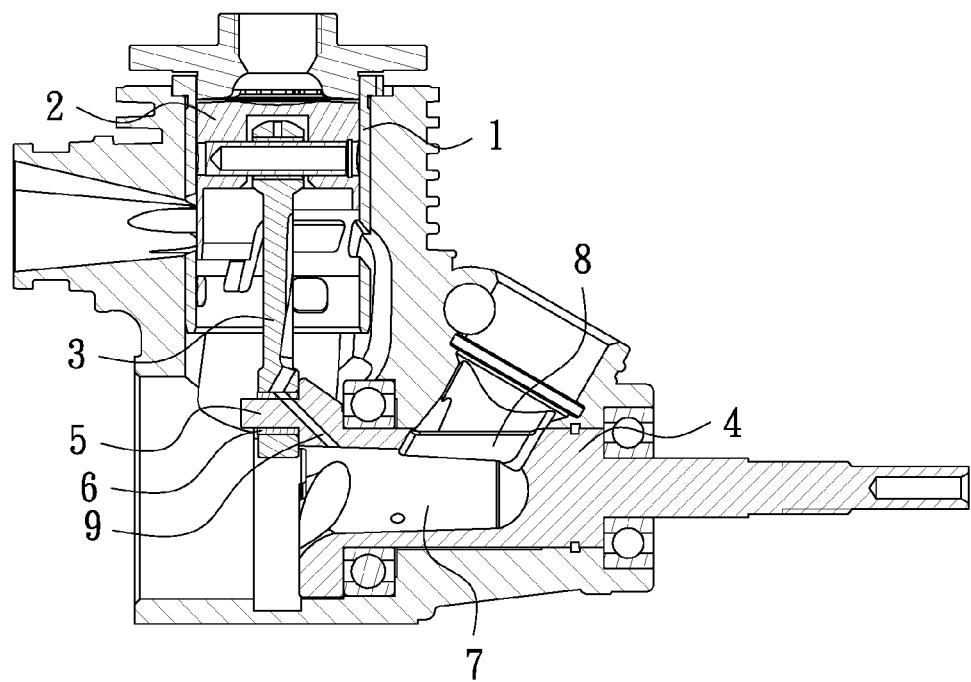
FIG. 1 is a cross-sectional view of a conventional model engine.
Figure 2:
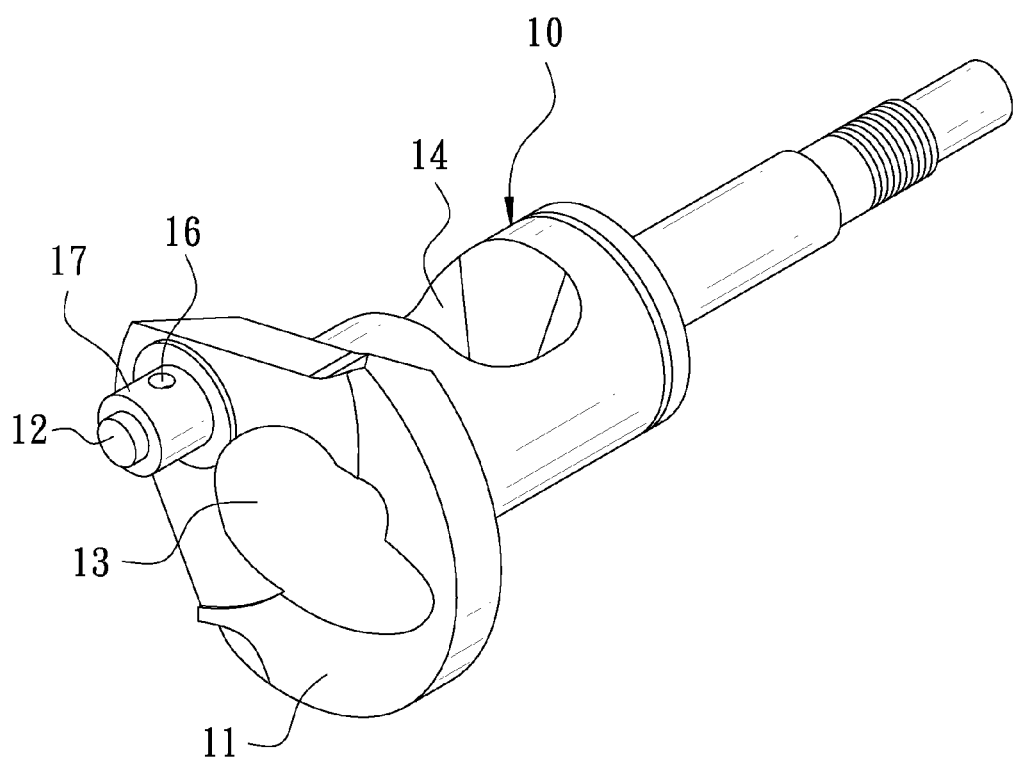
FIG. 2 is a perspective view of an oil collection and forced lubrication structure of a model engine crankshaft in the present invention.
Figure 3:
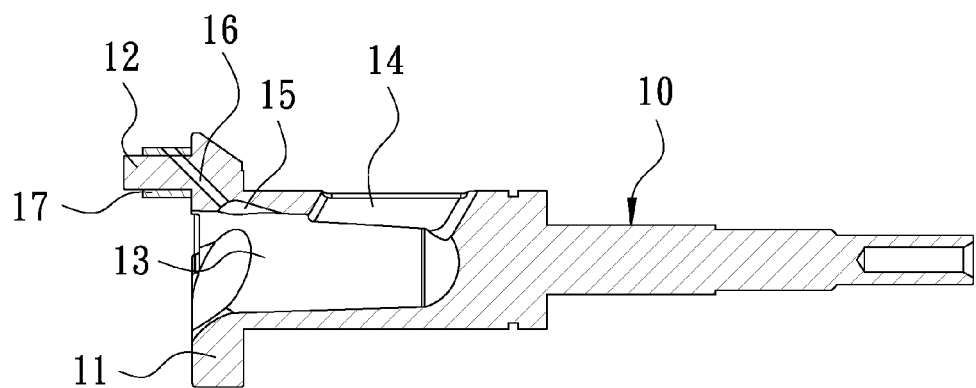
FIG. 3 is a cross-sectional view of the oil collection and forced lubrication structure of a model engine crankshaft in the present invention.

A preferred embodiment of an oil collection and forced lubrication structure of a model engine crankshaft in the present invention, as shown in FIGS. 2 and 3, includes a crankshaft body 10 having one axial end radially provided with a bulging disk 11 having its end face fixed thereon with a projecting shaft 12 at a location deviating from the center of the crankshaft body 10, and the projecting shaft 12 is axially provided along the crankshaft body 10 and has its radial outer circumferential side firmly fitted thereon with a brass bush 17. The bulging disk 11 of the crankshaft body 10 has one end face bored with a passageway 13 axially extending to an intermediate section of the crankshaft body 10 and gradually contracted toward the center of the crankshaft body 10, in other words, the inner diameter of the passageway 13 is gradually enlarged toward the end of the crankshaft body 10. The crankshaft body 10 has one side of its intermediate section bored with a through port 14 communicating with the passageway 13. A main special feature of this invention is that the passageway 13 of the crankshaft body 10 has a circumferential wall disposed with an oil-collecting groove 15 located between the through port 14 and the opening of the passageway 13 at the end face of the bulging disk 11. Both the oil-collecting groove 15 and the through port 14 are positioned at the same side of the crankshaft body 10 and axially formed along the crankshaft body 10, and the oil-collecting groove 15 gradually increases its depth from a point near the through port 14 to a location far from the through port 14. Further, the oil-collecting groove 15 of the crankshaft body 10 has its bottom bored with a lubrication hole 16, which obliquely extends toward the projecting shaft 12 and has its end passing through the circumferential wall of the projecting shaft 12. What is worth mentioning is that the oil-collecting groove 15 is generally in a water drop shape and is gradually enlarged toward the lubrication hole 16, and the oil-collecting groove 15 has its lengthwise side formed axially along the crankshaft body 10 and has its depth increasing gradually toward the lubrication hole 16, thus facilitating oil gas to get into the lubrication hole 16.

Figure 4:
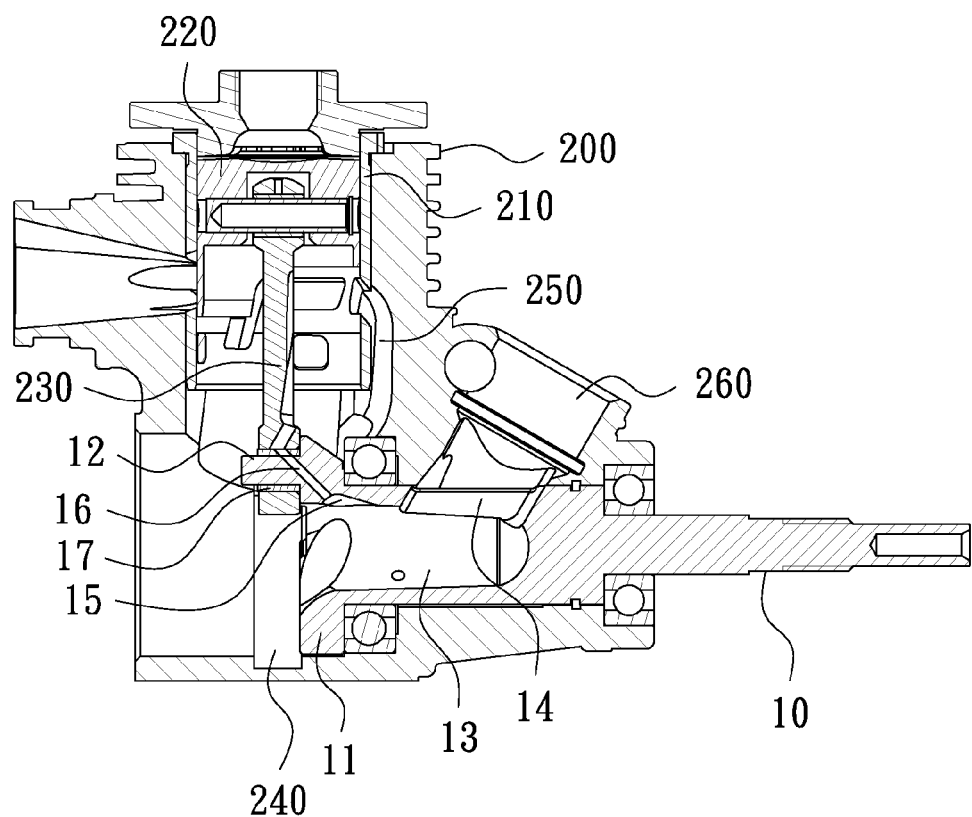
FIG. 4 is a cross-sectional view of the oil collection and forced lubrication structure of a model engine crankshaft in a using condition in the present invention.
Figure 5:
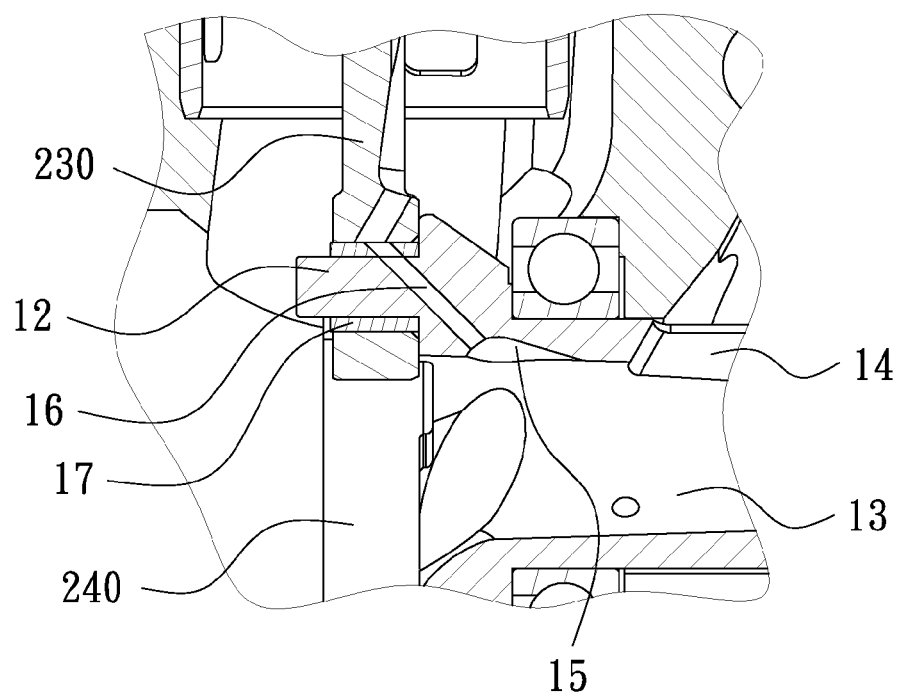
FIG. 5 is a partial magnified view of the oil collection and forced lubrication structure of a model engine crankshaft in the present invention.

Referring to FIGS. 4 and 5, the crankshaft body 10 can be assembled in a crankshaft chamber 240 of a model engine 200 and axially and pivotally coupled with a piston rod 230 by means of the projecting shaft 12 fitted with the brass bush 17 for operating together with the piston rod 230, and the through port 14 of the crankshaft body 10 exactly can be aligned to an air intake 260 of the model engine 200. Thus, when the model engine 200 is operated, the piston 220 of the model engine 200 will drive the crankshaft body 10 to rotate through the piston rod 230, and the through port 14 of the crankshaft body 10 is able to match with the period of cycling of reciprocating motion of the piston 220 to communicate with the air intake 260 so that mixed oil gas of fuel oil with air can get into the passageway 13 through the air intake 260 and the through port 14 during the cycling period of reciprocating motion of the piston 220. Afterwards, the oil gas in the passageway 13 will pass through the crankshaft chamber 240 and then through a scavenging port 250 formed beside a cylinder 210 of the model engine 200 and finally enter the cylinder 210 for the model engine 200 to operate.

When the oil gas passes through the passageway 13, the oil gas will be cast outward and attached on the inner circumferential wall of the passageway 13 by the centrifugal force produced when the crankshaft body 10 is rotated at high speeds; therefore, the oil-collecting groove 15 provided at the circumferential wall of the passageway 13 can collect the oil gas for accumulating and pre-storing the oil gas therein. Then, by making use of the centrifugal force produced by rotation of the crankshaft body 10, the oil gas accumulated in the oil-collecting groove 15 can be forced to pass through the lubrication hole 16 and be cast toward both the projecting shaft 12 and the circumferential wall of the brass bush 17 to let the portion between the brass bush 17 and the piston rod 230, that is, the axially and pivotally connected portion of the projecting shaft 12 and the piston rod 230 form a layer of oil film for attaining an effect of forced lubrication. And the existing oil gas in the passageway 13 of the crankshaft body 10 can be utilized to effectively enhance lubrication at the mutually coupled portion of the crankshaft body 10 and the piston rod 230, thus enabling the crankshaft body 10 to rotate smoothly and further greatly elevating engine efficiency and horsepower output.

A first advantage of this invention is that the oil-collecting groove 15 can function to accumulate and pre-store oil gas so that the oil gas can easily get into the lubrication hole 16 for attaining lubricating effect, able to greatly enhance lubrication to the coupled portion of the crankshaft body 10 and the piston rod 230. Thus, even if the crankshaft body 10 is operated at high speeds and rotated more than 18000 rpm, the oil gas still can produce a marked effect of sufficient lubrication to the coupled portion of the crankshaft body 10 and the piston rod 230 by utilizing the centrifugal force, thus preventing the brass bush 17 at the coupled portion of the crankshaft body 10 and the piston rod 230 from being damaged.

A second advantage of this invention is that the oil-collecting groove can be additionally provided by marking use of an existing crankshaft for pre-storing oil gas to enhance opportunities for the oil gas to enter the lubrication hole for increasing lubrication effect. By so designing, this invention can attain effect of enhancing lubrication by utilizing the existing proportion of oil gas intake quantity; therefore, it is unnecessary to alter setting of oil gas ratio to affect operation of the model engine and it is also unnecessary to change the crankshaft and the structural design of the model engine and further, it is needless to provide additional members for elevating lubricating effect, able to lower cost in enhancement of lubricating effect and thus increasing economic gains.

While the preferred embodiment of the invention has been described above, it will be recognized and understood that various modifications may be made therein and the appended claims are intended to cover all such modifications that may fall within the spirit and scope of the invention.

What is claimed is:

1. An oil collection and forced lubrication structure of a model engine crankshaft comprising a crankshaft body, said crankshaft body having one end provided with a projecting shaft, said crankshaft body having a face of one end where said projecting shaft is provided with a passageway, said crankshaft body further bored with a through port, said through port communicating with said passageway, said passageway having a circumferential wall bored with a lubrication hole, said lubrication hole extending toward said projecting shaft, said lubrication hole having an end passing through a circumferential wall of said projecting shaft; and characterized by, an oil-collecting groove provided at a circumferential wall of said passageway, said oil-collecting groove formed at a point of said lubrication hole, said oil-collecting groove is generally of a water drop shape and is gradually enlarged toward said lubrication hole; and said lubrication hole positioned in said oil-collecting groove, to facilitate oil gas to get into the lubrication hole.

2. The oil collection and forced lubrication structure of a model engine crankshaft as claimed in claim 1, wherein a depth of said oil-collecting groove increases generally toward said lubrication hole.

3. The oil collection and forced lubrication structure of a model engine crankshaft as claimed in claim 1, wherein said oil-collecting groove has a lengthwise side axially formed along said crankshaft body.

4. The oil collection and forced lubrication structure of a model engine crankshaft as claimed in claim 1, wherein said through port is formed at a bottom side of said passageway.

\* \* \* \* \*